Nov. 20, 1928.
L. A. WEBER
1,692,713
AUTOGRAPHIC SPEED RECORDER
Filed March 4, 1927   2 Sheets-Sheet 1
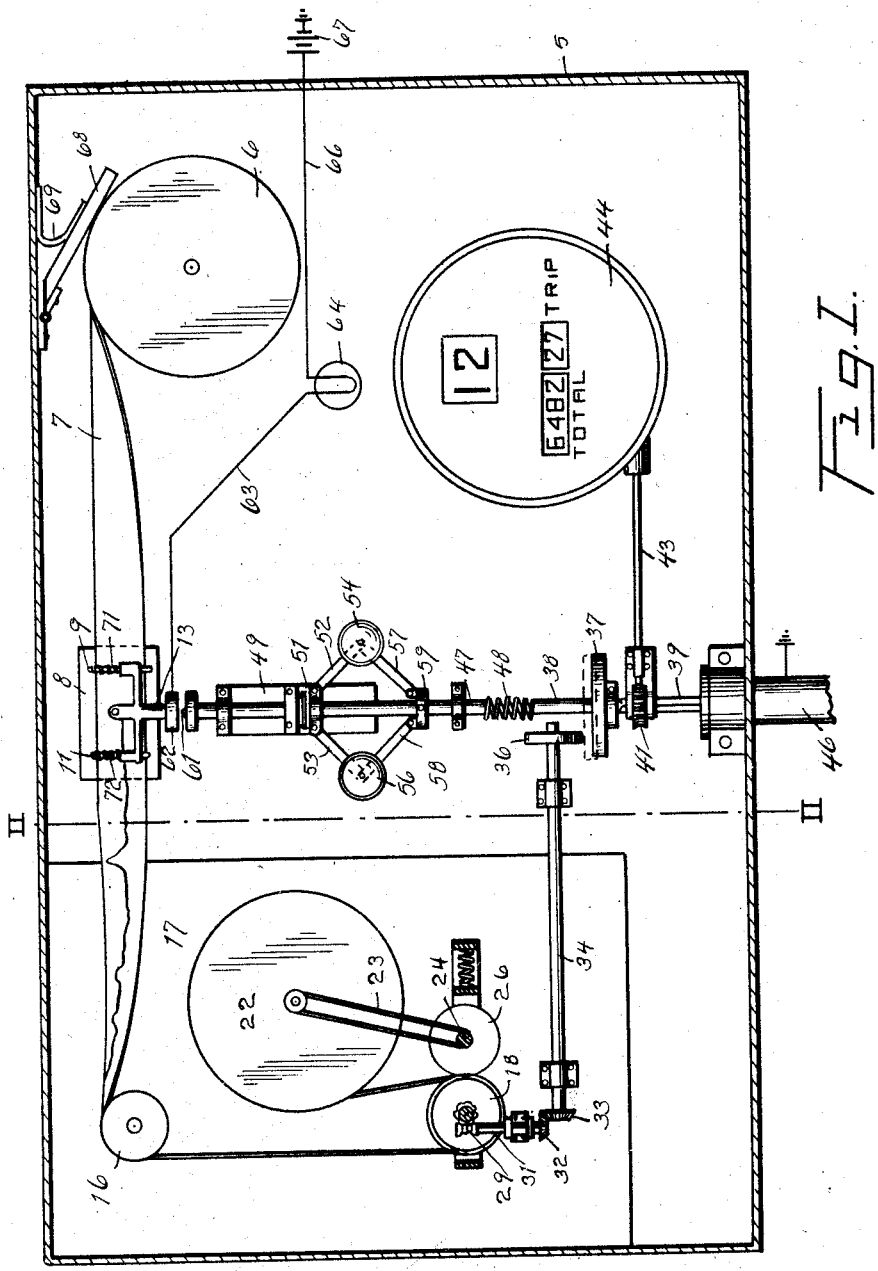
INVENTOR.
L. A. WEBER
BY *Victor J. Evans*
ATTORNEY Nov. 20, 1928.
L. A. WEBER
1,692,713
AUTOGRAPHIC SPEED RECORDER
Filed March 4, 1927   2 Sheets-Sheet 2
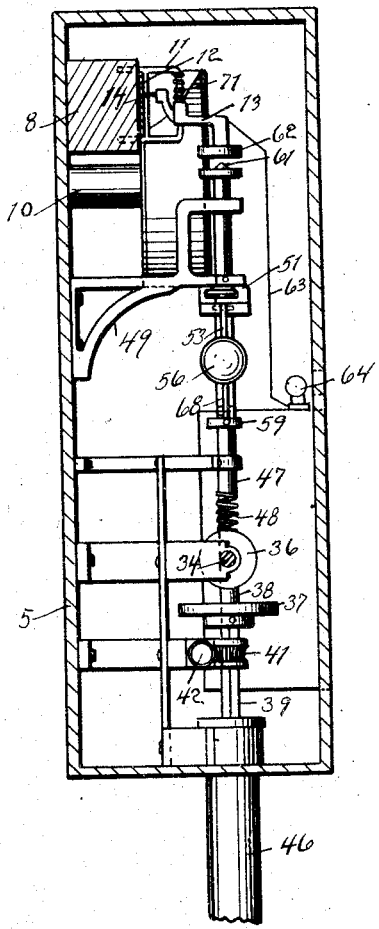
Fig. II.
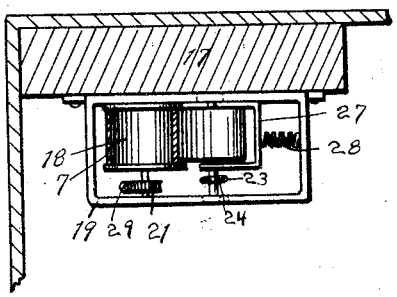
Fig. III.
INVENTOR.
L. A. WEBER
BY *Victor J. Evans*
ATTORNEY Patented Nov. 20, 1928.

1,692,713

UNITED STATES PATENT OFFICE.

LEONARD A. WEBER, OF SAN FRANCISCO, CALIFORNIA.

AUTOGRAPHIC SPEED RECORDER.

Application filed March 4, 1927. Serial No. 172,851.

This invention relates to improvements in devices for recording excessive speed of vehicles and particularly motor vehicles.

The principal object of this invention is to provide means whereby a permanent record is made when the vehicle upon which the device is positioned exceeds a pre-determined speed.

A further object is to provide a device of this character which may be secured to the vehicle in such a manner that it will be automatic in operation.

A further object is to provide means whereby road vibrations and the like will not affect the functioning of the apparatus.

A still further object is to provide means whereby the recording tape will only be moved when the speed of the vehicle has reached a predetermined point.

A still further object is to provide a device of this character which is simple and therefore economical to manufacture, and one wherein the parts will not become easily dearranged.

Other objects and advantages will be apparent during the course of the following description.

In the accompanying drawing forming a part of this specification, and in which like numerals are employed to designate like parts throughout the same, Figure I is a front elevation of my device with the housing broken away so as to disclose the interior thereof, Figure II is a vertical cross-section taken on the line 2—2 of Figure I, and Figure III is an enlarged detail cross-section of the tape actuating mechanism.

In practically all States, there is a law which prohibits a motor vehicle from traveling at a speed greater than that designated by law. At the present time, the only means of ascertaining the speed at which the vehicle is traveling is by viewing the speedometer. It is obvious, however, that when the vehicle slows down the speed reading decreases and therefore it is impossible to ascertain whether the vehicle has exceeded the speed limit throughout its run.

With my device it will be possible for one in authority to examine the tape at any time and to then be able to check the violation of the law.

In order to warn a driver that the device is recording, I have provided a tell-tale light which may be positioned at any convenient point so that the driver will observe the same as soon as it becomes illuminated. This will serve as a check to prevent the recording of excessive speed, by permitting the driver to decrease his speed before a damaging record has been made.

In the accompanying drawings wherein for the purpose of illustration is shown a preferred embodiment of my invention, the numeral 5 designates a housing which may be positioned at any point upon a vehicle, preferably to the instrument board thereof. This housing may be so arranged that it may only be opened by a person in authority.

Within this housing, I position a reel 6 which is supported by a bearing 10 secured to the housing 5. This reel carries a tape 7 which tape passes over a block 8 having guides 9 and 11 supported therein. These guides are substantially U-shaped as is best shown in Figure II, and have extending between the arms thereof a brace 12 which serves to best hold the tape 7 in close contact to the block 8.

Mounted upon the guides 9 and 11 is a stylus carrier 13 having a stylus 14 adapted to contact the tape 7 so as to make a mark thereon whenever the tape is moved with relation to the stylus. This tape is carried over an idler 16 which is supported upon a block 17 mounted within the housing 5. The tape is then reaved over a driving drum 18 journaled in a frame 19, which frame is secured to the block 17.

A worm gear 21 serves as a means for rotating the drum 18. After passing over the drum 18, the tape is wound upon a reel 22, also supported upon the block 17 and rotated through the medium of a belt 23 which passes over a pulley 24 carried upon a pressure roller 26. This pressure roller is carried in a yoke 27 and has the ends of its shaft carried in slots formed in the frame 19. This permits lateral movement of the pressure roller 26 and through the medium of a spring 28, it is kept in contact with the tape 7 at a point where it passes over the drum 18.

A worm 29 carried upon a shaft 31 is driven by a miter gear 32 which meshes with a miter gear 33 carried upon a shaft 34. This shaft 34 has a friction disc 36 secured to its opposite end, which friction disc is adapted to be engaged by a friction disc 37 mounted upon a vertically disposed shaft 38.

This shaft 38 has its lower extremity squared as shown at 39, upon which squared portion is positioned a worm gear 41. This worm gear 41 is engaged by a worm 42 secured to a shaft 43 which is adapted to drive a speedometer 44. This speedometer may be the kind ordinarily displayed upon a motor vehicle.

At 46, I have shown the ordinary speedometer cable housing which enters the housing 5 and within which the customary driving means is positioned. This driving means is capable of rotating the squared portion 39 of the shaft.

The shaft 38 is connected to a shaft 47 by a spring drive 48. The spring drive permits movement of the two shafts 38 and 47 with respect to each other as will be later described.

At 49 I have shown a bracket rotatably secured to which as at 51 is a yoke to the opposite sides of which are connected arms 52 and 53 of a ball governor having balls 54 and 56 which are in turn secured through the medium of links 57 and 58 respectively, to a fitting 59 which is pinned to the shaft 47. Carried upon the upper extremity of the shaft 48 is a bearing point 61 which is adapted to engage the under surface of a contact plate 62 which is secured to the stylus carrier 13. The contact plate 62 has a wire 63 connected thereto, which wire leads to a bulb 64 from which bulb a wire 66 connects to the battery 67 of the vehicle.

It is of course understood that the opposite side of the battery 67 is ground which will complete the circuit through the device back to the bearing point 61, the result being that as the bearing point 61 is brought into engagement with the contact 62, the circuit will be completed and the light 64 illuminated.

The operation of my device is as follows:—

Assuming that the vehicle upon which the device is secured is proceeding over a highway and that the speed limit has been set for 35 miles per hour, the actuation of the speedometer cable will impart rotation to the shaft 38, through the squared portion 39. The governor balls however are of sufficient weight that they will not throw out until a speed in excess of 35 miles per hour has been reached.

As soon as this speed has been reached, these balls will be thrown out with the result that they will pull upwardly upon the fitting 59 and consequently on the shaft 47. This pulling up will also cause through a spring 48, the raising of the shaft 38 and the friction disc 37. As soon as the friction disc 37 comes into contact with the friction disc 36, rotation will be imparted through the shaft 34 to miter gears 33 and 32 to the shaft 31 and worm 29. This will cause the drum 18 to rotate with the result that the tape will be drawn from the reel 6 past the stylus 14 over the idler 6, and over the drum 18 onto the reel 22.

The result is that a mark will be drawn upon the tape 7. Should the driver exceed the speed limit of 35 miles per hour, the balls of the governor will tend to move further outward, thus pushing the shaft 47 further upwardly which will be permitted through the action of the spring 48. Although the friction disc 37 is in contact with the disc 36, it will not permit further upward movement of the shaft 38.

As soon as the speed is decreased to a point below 35 miles per hour, the parts will return to their normal position and movement of the tape will cease, and the light 64 will be extinguished.

In order to prevent the reel 6 from unwinding too fast, I have provided a brake 68 which is held in contact with the periphery of the reel 6 by a spring 69, and in order to prevent excessive up and down movement of the stylus due to vibration, I have provided springs 71 and 72 which are coiled upon the guides 9 and 11 and bear against the stylus carrier 13.

It will thus be seen that I have provided a device which will make a permanent record of the speed of a motor vehicle in excess of a predetermined amount.

It is to be understood that the form of my invention herewith shown and described, is to be taken as a preferred example of the same, and that various changes relative to the shape, size, material and arrangement of parts may be resorted to without departing from the spirit of the invention, or the scope of the subjoined claim.

Having thus described my invention, I claim:—

In a speed recording device, a housing an actuating means connected with said housing, a shaft connected to said actuating means, a second shaft in axial alignment with said first mentioned shaft, a spring interposed between said shafts, and connected to each of said shafts, a governor secured to said second mentioned shaft, and adapted to move said shaft endwise, a stylus adapted to be moved through the endwise movement of said shaft, a tape passing beneath said stylus, means for moving said tape, said means comprising a friction disc secured on said first mentioned shaft, a second friction disc adapted to be contacted by said first mentioned disc, a driving drum over which said tape is reaved, and means for rotating said driving drum from said second mentioned friction disc.

In testimony whereof I affix my signature.

LEONARD A. WEBER.